Sept. 28, 1943. K. HEFEL 2,330,581
POWER TRANSMISSION
Filed Nov. 27, 1937  3 Sheets-Sheet 1
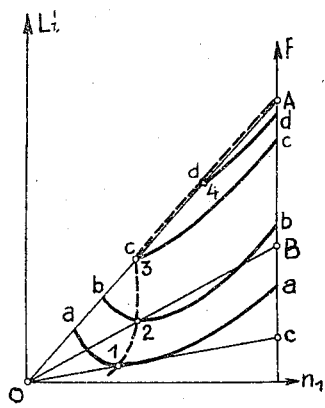
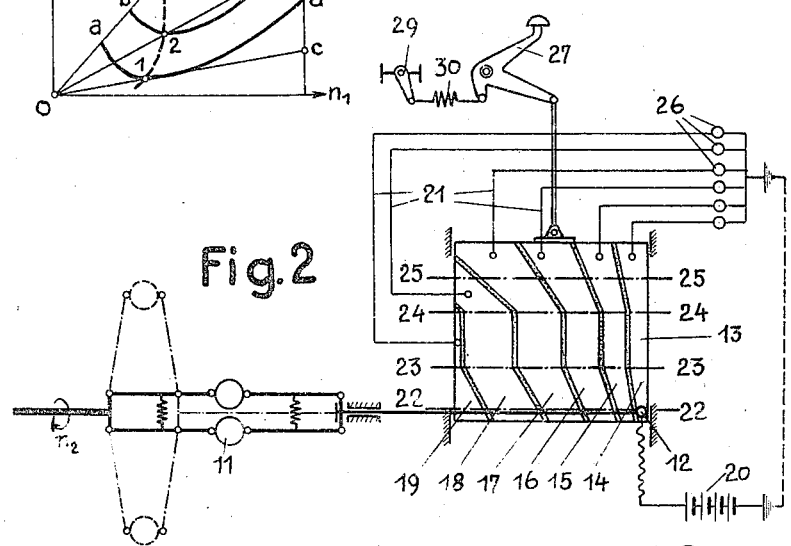
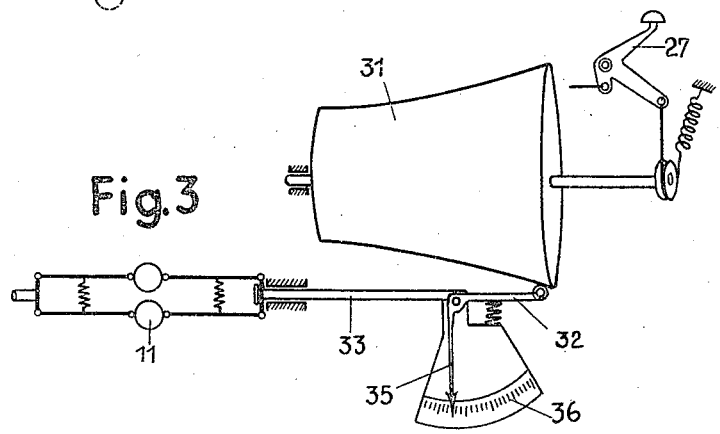
Karl Hefel
INVENTOR
his ATTY.

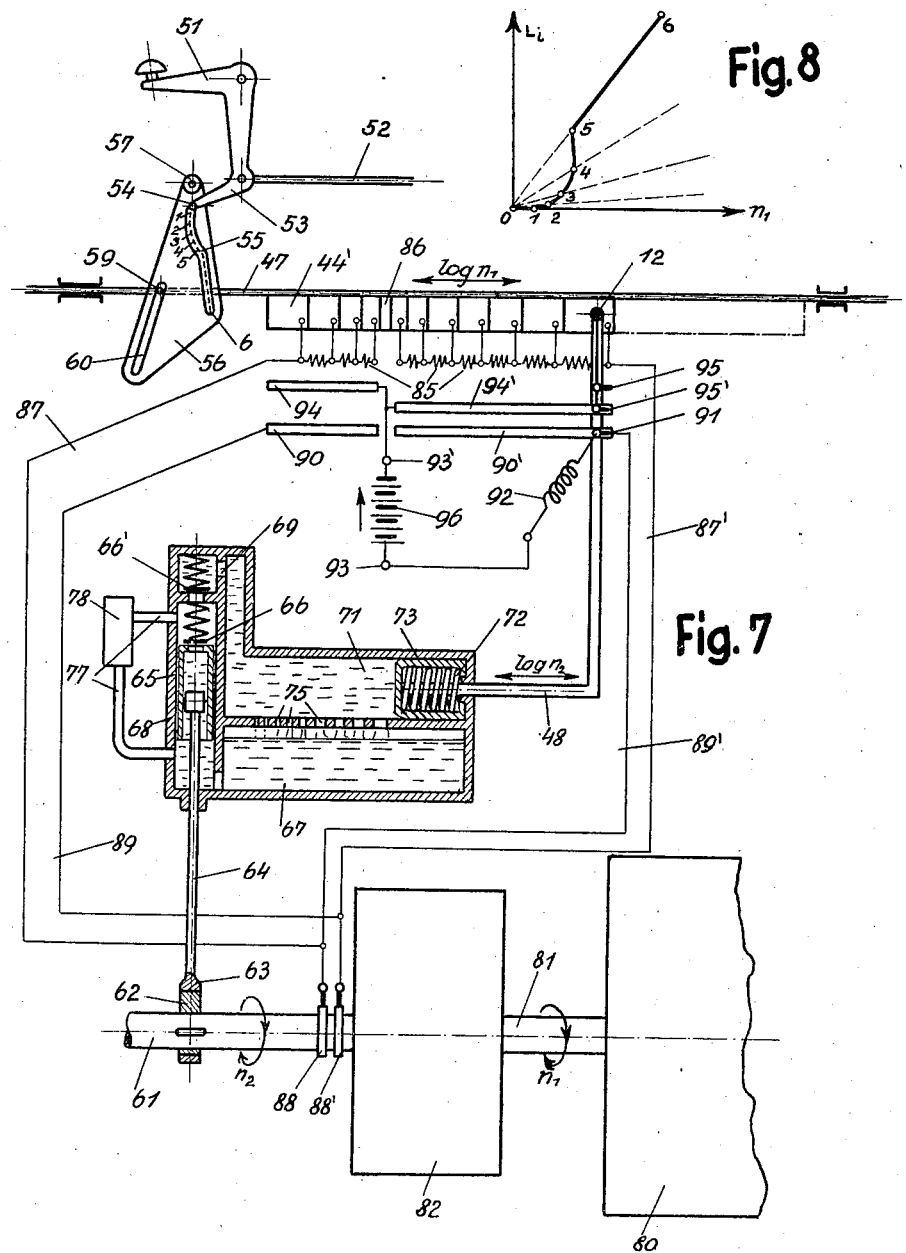

Patented Sept. 28, 1943

2,330,581

UNITED STATES PATENT OFFICE 2,330,581

POWER TRANSMISSION

Karl Hefel, Innsbruck, Austria; vested in the Alien Property Custodian

Application November 27, 1937, Serial No. 176,941
In Austria December 1, 1936

1 Claim. (Cl. 74—472)

This invention relates to a power transmission.

Mechanisms are known which effect automatic changing in variable-speed gears in dependence on the position of the accelerator of an internal-combustion engine driving the gear and on the magnitude of an output factor (speed $n_2$ or torque $M_2$) of the gear. With these mechanisms the driver always directly actuates only the fuel regulating member, while the gear ratio is determined by the magnitude of the output factor and a member operated by the accelerator.

The object of the present invention (which is especially applicable to gears of continuously variable ratio) is to establish in the engine, for any desired power output, only that operating condition which is efficient when judged on the basis of the characteristic of the engine. This operating condition is characterised by a specifically determined position of the fuel regulating member and a particular corresponding speed $n_1$ (or torque $M_1$) of the engine. This operating condition must remain uninfluenced by the running resistance, that is the arrangement must be such that alterations in the running desistance effect such variations in the transmission ratio that the speed $n_1$ of the engine remains unchanged as long as the engine power output is required to remain constant. Furthermore, control by direct operation of the accelerator alone is insufficient over the whole range of power output. Beyond a certain power the most efficient operating condition requires full throttle opening, further increase in power output being obtainable only by raising the associated speed $n_1$. However these operating conditions cannot be obtained if the driver controls only the ordinary accelerator. Thus previously known arrangements are not capable of solving the problem forming the basis of the present invention, because they do not render the engine speed independent of the running resistance and because the driver can influence the control of the gear ratio only by voluntary determination of the fuel supply.

According to the present invention, on the contrary, there is provided a member for selecting a desired effective (brake) power output of the engine, which on the one hand actuates the fuel supply member and brings this member always into the position which for the selected effective power output gives the optimum efficiency on the basis of the engine characteristic (explained subsequently in connection with Fig. 1 of the accompanying drawings) that determines the most efficient values, over the whole range of power output, of the fuel supply and speed of the engine, said power selecting member and another member controlled by an output magnitude of the gear serving on the other hand to actuate the adjusting and/or the indicating means for the gear ratio in such a manner that the speed of the engine assumes, automatically, the value for the selected power output that is the most efficient as determined by the said engine characteristic.

Although the examples to be described relate mainly to conditions occurring in a vehicle driven by an internal combustion engine, the same arrangement is applicable to many other like drives in different spheres of the art.

An effective control is particularly conveniently secured where the gear provides not only a sub-synchronous, but also a super-synchronous transmission to the driven shaft.

Although in the course of the present specification the speed $n_2$ of the driven shaft is always taken as one of the two factors of regulation for the transmission ratio it is to be understood that in many cases the reciprocal value for the torque of the driven shaft might also be used in a similar manner. This course however is more complicated and not always feasible.

The automatic ascertaining (adjusting) device according to the invention is directly applicable to any type of transmission gearing in which the changing over from one transmission ratio to another is electrically initiated and carried out, as also to every properly electric transmission gear.

The invention will now be described in greater detail, reference being had to the accompanying drawings comprising graphs and diagrammatic representations of examples of the embodiment of the invention, in which:

Fig. 1 shows graphically the dependence of the indicated output of an internal combustion engine on its speed at different degrees of admission to the cylinders of the engine.

Fig. 2 is a diagrammatic representation of a device for the automatic adjustment or indication of the most economical transmission ratio.

Fig. 3 shows diagrammatically another type of device for the automatic indication of the most economic transmission ratio.

Figure 4:
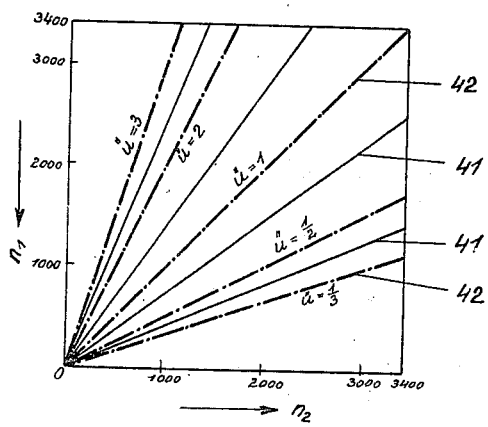
Figure 6:
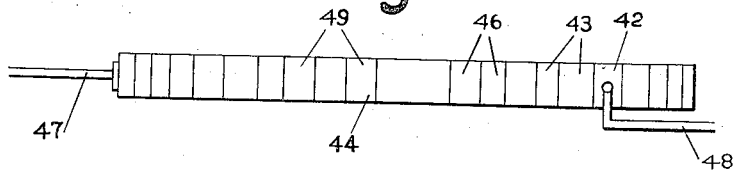
Figure 5:
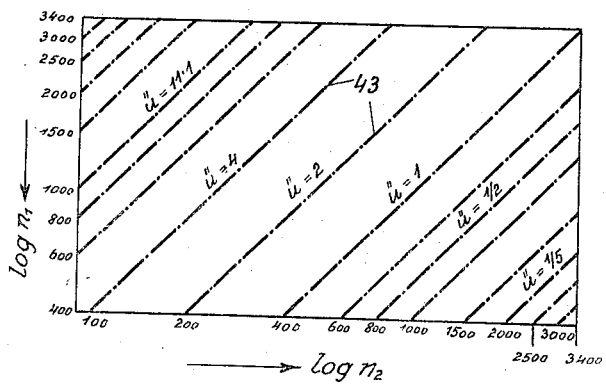

Figs. 4, 5, and 6 show a detail (contact plate), Fig. 7 a complete lay-out, and Fig. 8 an engine characteristic curve similar to that shown in Fig. 1.

Referring to Fig. 1, $Li$ denotes the "indicated output" of the internal combustion engine considered, that is to say the quantity of fuel admitted to the engine in unit time, and $n_1$ denotes the engine speed. In the following discussion the flow resistance and pressure drop in the gas ducts are neglected, in order to present the matter as simply as possible, since this discussion is required merely to explain the problem, which is not altered by taking these losses into account. When these losses are neglected, the fuel admitted to the engine per hour ($Li$) increases in proportion to the speed $n_1$. Accordingly the indicated outputs for various definite amounts of throttle opening can be represented respectively by straight lines O—A, O—B, O—C, A, B, C being considered as amounts of throttle opening and therefore as degrees of admission $f$.

If in this graph the points of equal "effective output" (brake power) of the engine at various engine speeds are connected together, there are obtained curves such as $a$—$a$, $b$—$b$, $c$—$c$ and $d$—$d$, which correspond respectively to four effective outputs. The lowest points 1, 2, 3, 4 on these curves give the speeds $n_1$, which yield the highest efficiency, at the corresponding degrees of admission $f$ (throttle opening), for obtaining the effective output corresponding to the curve concerned. Now, if the maximum-efficiency points so obtained are connected together, there is obtained the dotted curve 1—2—3—4—A, which is the characteristic curve giving the most efficient values of fuel admission and speed $n_1$ for the whole range of effective power output. If therefore maximum efficiency is to be obtained at different effective outputs the charge $f$ and the speed $n_1$ must be adjusted according to the broken line 1—2—3—4—A for instance if the characteristic of the engine is as shown in Fig. 1. This may be achieved by appropriate selection of the transmission ratio. This proper transmission ratio is automatically adjusted and/or indicated in accordance with the invention for example by means of the following contrivance or arrangement.

In Fig. 2, 11 denotes a centrifugal governor the speed of which is equal or proportional to the speed $n_2$ of the driven shaft. The governor 11 shifts the contact 12 towards the left as the speed increases, with the result that this contact slides over a contact path 22—22 on the contact plate 13. The contact plate 13 is moved in dependence on the setting of the regulating member by means of which the internal combustion engine is controlled, namely of the throttle control or accelerator lever 27. This plate is divided up into mutually insulated areas 14, 15, 16, 17, 18, and 19, the area 14 corresponding to the first gear ratio, area 15 to the second gear ratio, and so forth. From the current collector 20 a current circuit is closed in each case through the contact 12, the contact area on which this contact bears for the time being, through the wire 21, the releasing relay 26 pertaining to this area, and ground or the grounded mass of the surrounding parts. The relay 26 releases for operation the gear changing mechanism (which as being non-essential to the present invention is not described in detail here) for the engaging of the required transmission ratio, or for the optical indication of the ratio or speed to be engaged by hand. In the case of electric transmission gears the required excitation for the attainment of a certain transmission ratio may be directly adjusted by the contact paths or areas 14 to 19.

As long as the setting of the accelerator lever 27 remains unchanged the position of the contact plate 13 remains unchanged also. Thus on alteration of the speed $n_2$ the contact 12 slides along the line 22—22. The contact paths 14, 15, and so on are so distributed along this line 22—22 that the appropriate transmission ratios $ü$ vary in inverse proportion to the speeds $n_2$ of the driven shaft, so that the product of $n_2 \times ü$ remains the same or is a constant magnitude. This constant is equal to the speed $n_1$ of the driving shaft, for $n_2 \times ü = n_2 \times n_1/n_2 = n_1$. That is to say, when the transmission ratio is actually adjusted according to this rule the driving speed $n_1$ remains constant, provided the charging of the engine, i. e. the setting of the throttle lever 27, be also at the same time kept constant. It is assumed for this purpose that the intervals between the ratios of which the gearing is capable are quite small; if these intervals are of considerable magnitude the figure for the driving speed fluctuates within certain limits about the constant value $n_1$ obtained in the case of transmission gears with stepless alteration of the transmission ratio. Alteration of the load thus only brings about an alteration of the speed $n_2$ of the driven shaft and of the transmission ratio between the driving and the driven shaft. The speed of the driving shaft, the charging of the engine, and therefore also the effective output of the engine remain constant.

The conditions on the line 22—22 are intended to correspond for example to point 1 in Fig. 1. If an effective output corresponding to curve $b$—$b$ in Fig. 1 is desired the point 2 gives the most economical conditions for the attainment of this output, that is to say both the charge $f$ and also the speed $n_1$ must be appropriately increased as compared with point 1. The required increase in the charging of the engine is obtained by further depressing the accelerator or throttle lever 27. This however at the same time causes the contact plate 13 to be shifted downwards, so that now the line 23—23 is brushed by the contact 12 (Fig. 2). Along this line the contact paths 14 to 19 are again required to be so distributed that the product of $n_2 \times ü$ is again equal to a constant determined by the new required speed $n_1$ at the point 2 (Fig. 1). In the same manner all intermediate distributions of the contact paths may be determined.

From point 2 to point 3 in Fig. 1 the most economical conditions are obtained by merely increasing the rate of charge of the engine while keeping the speed $n_1$ constant. At the point 3 the charging of the engine has attained its maximum. The contact plate is then downwardly displaced to such an extent that the contact 12 slides along the line 24—24. Since in this case the speed $n_1$ has no longer changed the distribution of the contact paths along the line 24—24 is the same as that along the line 23—23.

From point 3 to point A in Fig. 1 the effective output of the internal combustion engine is only altered by increasing the speed $n_1$ while the charge $f$ remains unaltered at its maximum value, since on further depression of the throttle lever 27 the setting of the throttle valve 29 can not be altered any further, for instance owing to the provision of a stop (not shown in the drawings). The further movement of the lever 27 towards the carburetor may be assumed to be taken up for example by a spring 30. On the other hand the contact plate 13 continues to be shifted downwards. For example the contact path 25—25 (Fig. 2) corresponds to the point 4 in Fig. 1. The distribution of the contact paths is again so determined, as before, that the product of $n_2 \times \ddot{u}$ remains constant, the new constant being given by the speed $n_1$ required in the point 4. In this manner all other points up to A are determined.

If the gear changing be effected as above described there will correspond to any one setting of the accelerator or throttle lever 27 (in the case of gears with sufficiently continuous change of transmission ratio) a certain speed $n_1$ and a certain degree of charging $f$ of the engine. If the proper angle of ignition advance be also made dependent on the setting of the regulating member 27 automatic attainment of the most favorable working conditions at any one moment will then be secured.

If the transmission ratio in a gearing be controlled automatically by a device of the above described nature there may also with advantage be provided a contrivance which allows of arbitrary interruption and reestablishing of the connection between the regulating member 27 and the throttle flap valve 29. When this connection is interrupted, depression of the lever 27 only effects shifting of the contact plate 13 downwards, while the throttle valve remains in the no-load running position. Displacement of the plate 13 downwards brings about an increase in the engine speed $n_1$ relatively to the speed $n_2$. This arrangement thus makes it possible, in an ideally simple manner, to brake the driven shaft with the aid of the engine by mere operation of the lever 27. Thus with this one lever, for example in the case of a motor vehicle, the entire regulation of output and speed, including braking, may be controlled.

It is not essential to the invention that the adjustment or indication of the proper transmission ratio be effected electrically. In Fig. 3 there is shown diagrammatically a device which indicates the most economical transmission ratio in a purely mechanical manner, so that hand adjustment may then be effected accordingly. For this purpose there is provided a roller 31 which is rotated according to the setting of the regulating member 27, and with the surface of which there coacts a feeling or scanning member 32, for instance an arm furnished with a roller, which is pivotally mounted on the rod 33. The feeling member is adjusted in an axial direction with respect to the roller by the centrifugal governor 11 in dependence on the speed $n_2$ of the driven shaft, and by a spring 34, against the roller. Rigidly connected with the feeling member 32 is a pointer 35 which plays over a scale 36 mounted on the rod 33.

According to the deflection of the governor 11 or to the setting of the regulating member 27, the roller 32 bears at different points against the surface of the drum. The surface of the drum 31 is so shaped that the angle of deflection of the feeling member 32 or of the pointer 35 relatively to a normal position is proportional to the most favorable value for the transmission ratio determined, in accordance with the characteristic of the engine, for each speed $n_2$ and each degree of charging $f$ (Fig. 1), or represents some other function of the same capable of representation in the form of a scale. In this manner the most economical value for the transmission ratio is rendered capable of being directly read off on the scale 36, and the gearing may then be adjusted by hand in accordance with this reading.

A gearing controlled in accordance with this invention acts as a perfect free-wheel gearing, since the speed $n_1$ of the driving engine goes back to idling speed when the regulating member 27 is returned into the no-load position, while the speed of the driven shaft is left unaffected.

From Fig. 2 it will be seen that the contact areas 14—19 are figures of quite irregular configuration. If the arrangement be such that the contact is displaced proportionately to the speed $n_2$ of the driven shaft, and the contact plate 13 displaced proportionately to the speed of the driving shaft $(n_1)$, this being perfectly possible according to what has been said above, since to each setting of the accelerator or throttle lever there corresponds a driving output and driving speed $n_1$ accurately determined by the characteristic of the engine, then the irregularly shaped contact areas become resolved into strips converging towards the origin.

To make this clear a transmission gear is assumed having nothing but the ratios $$n_1/n_2 = \ddot{u} = 1/3,\ 1/2,\ 1,\ 2,\ 3$$

In this case there is obtained a contact area as shown in Fig. 4, in which the full lines 41 denote the insulation strips, and the chain-dotted lines 42 the middle lines of the above-mentioned contact areas corresponding to the said transmission ratios. The lines 42 are nothing else but the graphic representation of the function $n_1 = \ddot{u} \times n_2$ in a system with the axes $n_1$ and $n_2$, in which it represents a straight line converging to the origin O. In this case the displacement of the contact or of the contact plate as shown in Fig. 2 in the directions of both axes is proportional to the speed $n_1$ or $n_2$, respectively.

If these displacements be taken proportional not to the speeds themselves but to their logarithms there is obtained a contact plate as shown in Fig. 5, since the relation is now given by the equation $$\log n_1 = \log \ddot{u} + \log n_2$$

which is represented in a system of coordinates with logarithmic divisions by parallel straight lines 43 inclined at an angle of 45° to the two axes, provided the standard for $\log n_1$ and $\log n_2$ be taken as the same; if the standard be different only the angle of inclination alters. (The insulating strips are omitted in Fig. 5.) In order to obtain appropriate conditions the contact plate shown in Fig. 5 would therefore have to be displaced vertically in dependence on $\log n_1$, and the contact (not shown) horizontally in dependence on $\log n_2$.

Owing to the fact that the straight lines 43 run parallel to each other there results a further simplification, inasmuch as in place of the movement in the two axial directions there is used the projection of these movements on a straight line at right angles to the lines 43. The contact plate 44 resulting from so doing is shown in Fig. 6 in which the lines 43 again appear as mid lines of contact areas separated from each other by insulating strips 46. This contact plate 44 thus has nothing but rectangular contact areas 49 defined by the mid lines 43, and is moved to and fro by a linkage 47 in dependence on the value of $\log n_1$, while the contact 12 is mounted on a linkage 48 which is moved to and fro in dependence on the value of $\log n_2$, so that the two movements are capable of being additive or of cancelling each other. It will be clear that by extensive subdivision into narrow areas a finely graduated regulation of the transmission ratio may be obtained, provided the construction of the gearing itself allow of such fine differentiation in the transmission ratio.

It thus becomes possible, for example in connection with electric gears, with the aid of quite simple apparatus, to vary the transmission ratio as finely graduatedly as desired, by associating with each contact area the excitation appropriate to the corresponding transmission ratio.

Fig. 7 shows apparatus of this description, for controlling the transmission ratio in dependence on the speed of the driven shaft on the one hand and on the output adjusted for by the setting of the output regulating member of the driving motor, on the other hand. For this purpose there is employed a contact plate 44' similar to that shown in Fig. 6, and the controlling of the plate 44' and of the brushing contact 12 must accordingly be effected in dependence on the value for log $n_1$ and that for log $n_2$, respectively. The means employed for this purpose will first be described.

The accelerator or throttle lever 51 first of all shifts the rod 52 leading to the carburetor of the driving motor 80. The accelerator lever 51, which is lengthened by the extension 53, is provided at its end with a pin 54. The characteristic of the driving motor is assumed as shown in Fig. 8 in which the curve 1, 2, 3, 4, 5, 6 represents the requisite regulating curve to obtain maximum efficiency, analogously to Fig. 2. With the degrees of charging of the engine corresponding to the points 1 to 6 the pin 54 assumes the correspondingly numbered positions in Fig. 7, for which purpose the pin 54 works in the slot 55 in the plate 56. At the same time the plate 56 is rotated about its pivot, and the rod 47, which is moved owing to engagement of a pin 59 attached to this rod in a slot 60 in the plate 56, and which carries the contact strip 44', carries out a longitudinal movement. The guide slot 55 in the pivoted plate 56 is so dimensioned that this longitudinal movement is proportional to the value for log $n_1$, as is required for the proper actuation of the contact plate 44, for the reasons already explained.

In a similar manner the movement of the rod 48 may also be made to depend on the shaft 61 driven with the speed $n_2$ in dependence on the value for log $n_2$, through the intermediary of a centrifugal governor (compare governor 11 in Fig. 2). In accordance with the invention, however, it is also possible to dispense with mechanical operating means altogether, and to move a rod or other element hydraulically from the driven shaft, according to any desired function, and more particularly according to a logarithmic function of the speed of rotation of the shaft, as is explained below.

To the shaft 61 rotating at speed $n_2$ there is keyed an eccentric 62, so that the connecting rod 64 attached to the eccentric ring 63, and the pump piston 65 carry out a stroke at each revolution of the shaft. By the action of the two non-return valves 66 and 66', liquid is continuously delivered from the sump 67 into the cylinder 68 of the pump, and through the conduit 69 into a second cylinder 71. In this latter there is provided a piston 73 which is longitudinally movable against the action of the spring 72, and to which there is connected a rod 48 carrying the contact 12. At intervals along the wall of the cylinder are provided holes 75 the aperture of which may be varied in any suitable manner, for example by means of small screws (not shown in the drawings). The liquid forced into this cylinder by the pump piston 65 shifts the piston 73 towards the right to such an extent that the quantity of liquid delivered at the prevailing speed $n_2$ can just flow back into the sump 67 through the ports uncovered by the pump piston. By suitable selection and adjustment of the apertures of the ports 75 it thus becomes possible to impart to the contact 12 the required movement effected in dependence on the value for log $n_2$.

In order to be able to check the proper functioning of this apparatus at any time there may further be provided, in accordance with the invention, in the space between the two valves 66 and 66' of the pump, a by-pass 77 with an adjustable throttle 78, through which a certain portion of the liquid delivered by the pump is returned into the sump 67. Since the displacement of the piston rod 48, that is to say the stroke of this rod, is an accurate measure of the speed $n_2$, and therefore in the case of vehicles also a measure of the speed of travel, the movement of the piston 73 may be transmitted to an indicator (not shown) marked off for example in kilometers per hour. If a conventional speedometer (not shown) be provided adjacent this indicator, these two instruments must always indicate the same speed of travel. These two instruments may also be combined in one, and in this case the two pointers must remain in register or coincident with each other as long as the apparatus is in order and functioning properly. If the setting of the contact 12 ceases to be accurately effected, for example owing to wear on the piston or cylinder of the pump or to fluctuations in the viscosity of the liquid due to differences of temperature, then the pointers will no longer remain in register with each other. It is then merely necessary to readjust the throttle 78 until the pointers move in register again. The regulating arrangement is then in proper working order.

If the above described gear is combined with the general lay-out shown in Fig. 7 the following result is obtained.

The driving motor, for example internal combustion engine 80, drives, through the intermediary of the shaft 81 rotating with the speed $n_1$, an electric transmission gear 82 of the type which consists of a motor-generator unit, and which acts in such a manner that the altering of the transmission ratio from subsynchronous running, through synchronized running, to hypersynchronous running of the driven shaft 61 is effected exclusively by altering the field excitation of the motor portion of the said unit from a minimum positive value, through zero, to a certain negative value. Gear of this kind is described in my co-pending application Serial Number 59,871. This altering of the excitation is effected by the contact plate 44' and/or by the contact 12.

The individual contact areas on the plate 44' are bridged over by resistances 85. Only the area 86, which corresponds to zero excitation, has no conductive connection. The end contacts are connected by the wires 87 and 87' to the slip rings 88 and 88' of the electric gear. Further, from these slip rings wires 89 and 89' lead to contact paths 90 and 90' on which there brushes a brush 91 mounted on the rod 48 and connected by the wire 92 to the one pole 93 of the battery 96. The pole 93' is in its turn connected to contact paths 94 and 94' on which the brushes 95 and 95' mounted on the rod 48 slide. There results the following mode of operation.

As long as the contact 12 touches area on the right-hand side of the zero contact 86 on the contact plate 44' the current circuit is closed through 93', 94', 95', 12, possibly 85, 87', 88', exciter winding of the motor part of the gear unit, 88, 89', 91, 92, 93. On relative movement of the contact 12 on the contact plate 44' towards the left the current becomes less and less owing to the additional connecting in of resistances 85, attains zero value on reaching the contact 86, and becomes reversed in direction after this contact has been passed over, since the current circuit is closed then through 93', 94, 95, 12, possibly 85, 87, 88, exciter winding, 88', 89, 90, 91, 92, 93. The first mentioned current circuit corresponds to subsynchronous and the second to hypersynchronous running of the driven shaft 61. Thus with a device of this description, the individual elements of which may of course be varied within wide limits, in conjunction with an electric transmission gear unit of the type indicated, it is possible, by mere operation of the output control (accelerator pedal for instance in the case of motor vehicles), so to vary the transmission ratio, with suitable adaptation to the resistance encountered (resistance to propulsion in the case of automotive vehicles), that the driving motor always works with maximum efficiency.

I claim:

In a power transmission unit including an internal combustion engine, means controlling the supply of fuel to said engine, a driven shaft, and a transmission gear with variable transmission ratio interposed between said driven shaft and said engine, the combination of a member for selecting any desired effective power output of the engine, said member being operatively connected with said fuel control means so as to effect correlated movements of said output selecting member and said fuel control means, two elements displaceable along a common path and being controlled by said power output selecting member and by an output magnitude of said gear, respectively, means whereby the element controlled by the output selecting member is displaced along said common path in proportion to the logarithms of the engine speed as said speed varies in accordance with the engine characteristic determining, over the whole range of power output, the most efficient values of fuel supply and engine speed, and means whereby the element controlled by an output magnitude of said gear is displaced along said common path in proportion to the logarithms of the speed of the driven shaft, said two elements cooperating with one another for adjustment of the transmission ratio of said gear to maintain the speed of the engine, irrespectively of the resistance encountered by the driven shaft, at the value corresponding to the selected power output in accordance with said engine characteristic.

KARL HEFEL.